Figure 1:
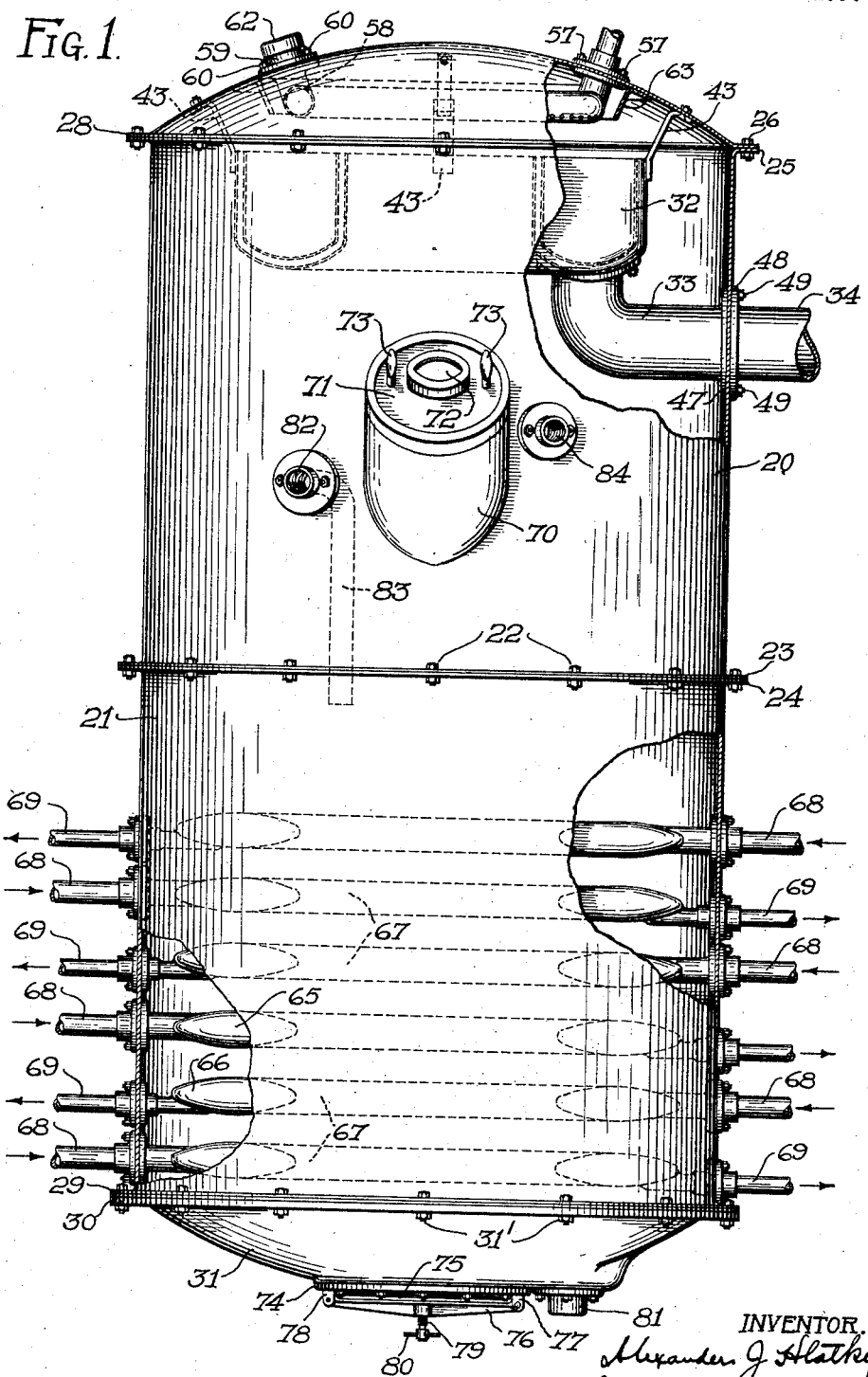

June 13, 1933.  A. J. HLATKY  1,913,547
CONDENSER
Original Filed March 24, 1930  2 Sheets-Sheet 2

INVENTOR.
Alexander J. Hlatky
BY Thomas H. Ferguson
ATTORNEY.

Patented June 13, 1933

1,913,547

UNITED STATES PATENT OFFICE

ALEXANDER J. HLATKY, OF CHICAGO, ILLINOIS

CONDENSER

Original application filed March 24, 1930, Serial No. 438,374. Divided and this application filed December 14, 1931. Serial No. 580,862.

The present invention relates to condensers of the type commonly used in vacuum pans and like containers and has to do with the water spraying and vapor guiding devices, usually located at the top of the container, by which the moisture freed from the heated liquid will be carried from the container.

Although my invention may be applied to different liquids in different treating methods, yet the invention has been devised and perfected with reference to the treating of milk and will be illustrated and described in that connection.

In carrying out my invention I provide a novel arrangement of trough, spray devices and baffling means. The trough extends about a central space, or opening, and is spaced from the walls of the container. Hence the vapors may pass upward around the trough both through the central opening and through the peripheral passage between the trough and wall. The condensing sprays come from a supply pipe which conforms to the shape of the trough and is positioned immediately above its open top. The baffling means likewise extend throughout the extent of the trough, or substantially so, and are located near the condenser pipe in position to engage and direct the vapors rising through both central and peripheral passages into effective contact with the water being ejected in small streams into the open mouth of the trough. Besides guiding the rising vapors of the liquid within the casing into intimate and well directed contact with the water jets which condense the vapors, the baffle also assists in maintaining continuous streams of vapor free from objectionable eddies. When installing the spray pipe, I also preferably provide an opening, accessible from the outside of the structure, through which a brush may be inserted into the interior of the pipe to clean it.

By directing vapors to the water jets from both sides of the latter, one stream coming through the central opening and the other through the peripheral passage, I am able to get a maximum of good out of a given flow of water, roughly speaking, about twice as much as where the vapors are directed against only one side of the water jets, as has been the practice in certain instances in the prior art.

In carrying out these features, I provide a structure which contributes materially to the production of a vacuum pan or the like which will be highly efficient in operation and require but low steam and water consumption.

These operating advantages are especially present when the invention is used with the novel heating units and other features of my prior United States application Serial No. 438,374, filed March 24, 1930, Patent No. 1,841,822, granted January 19, 1932, of which the present case is a division.

The various features and advantages of my invention will be more fully understood upon reference to the following detailed description taken in connection with the accompanying drawings, while the scope of the invention will be particularly pointed out in the appended claims.

Figure 2:
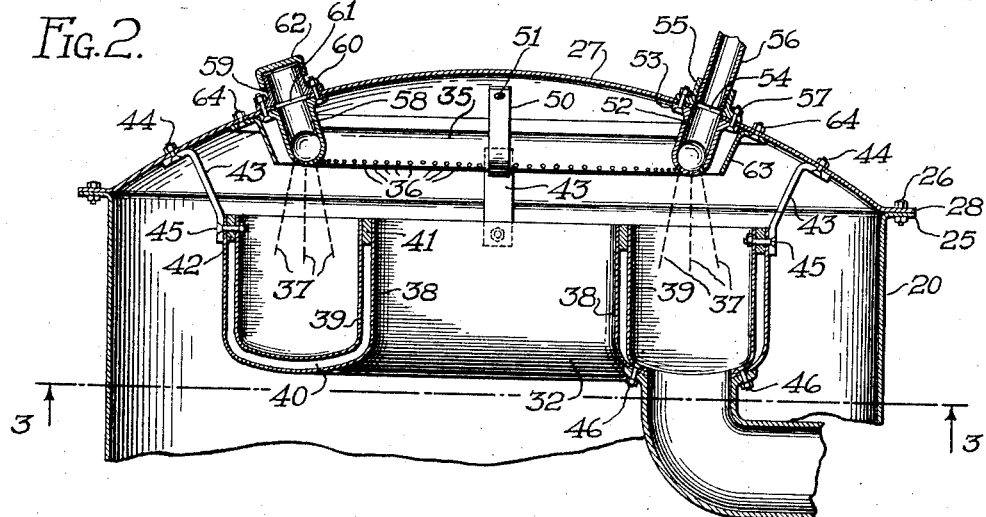
Figure 3:
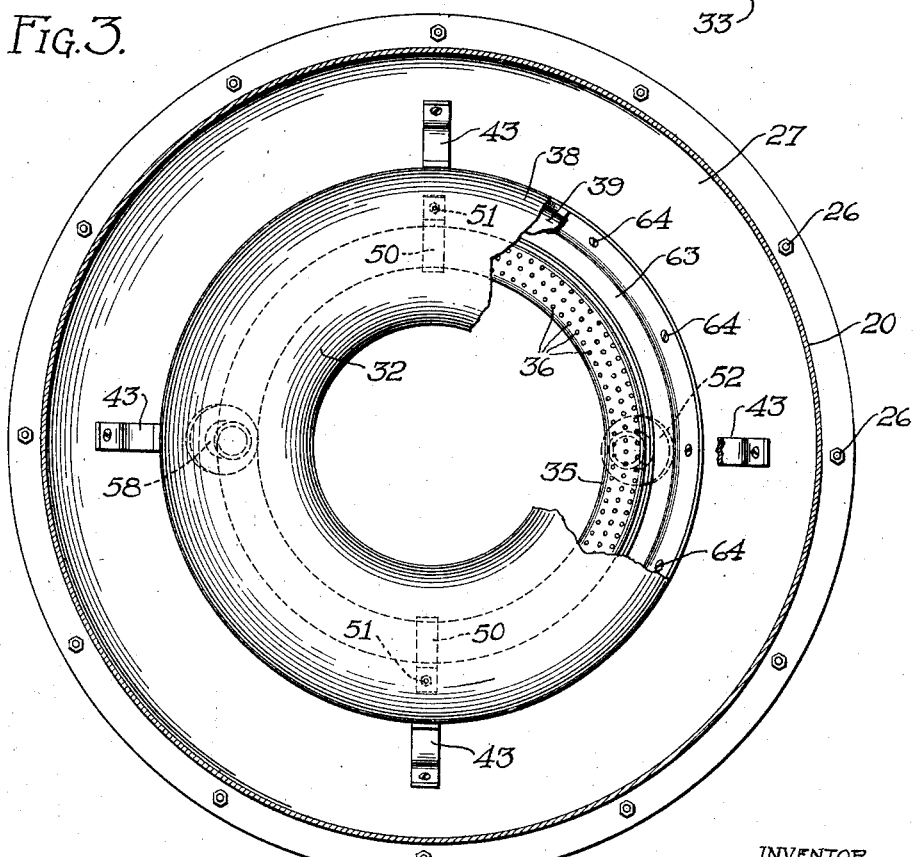

In said drawings, Fig. 1 is a side elevation of a vacuum pan provided with a condenser constructed and arranged in accordance with the present invention, portions of the shell or casing of the pan being broken away to show parts within; Fig. 2 is a central vertical section of the upper portion of the pan, illustrating particularly the condensing apparatus; and Fig. 3 is a bottom plan view of the structure of Fig. 2, the shell being shown in section taken on a plane indicated by the line 3—3 of Fig. 2, and portions of the trough of the condensing mechanism being broken away to show more clearly the spray outlets in the water supply pipe. Throughout these views like characters refer to like parts.

Referring to said drawings in detail, 20 and 21 designate, respectively, the upper and lower portions of the casing or shell of the vacuum pan. These two portions are made of sheet metal, preferably copper, and are connected together by bolts and nuts 22 coacting with openings in the mating flanges 23 and 24. The upper end of the member 20 is provided with a similar flange 25. To this flange bolts and nuts 26 secure the pan top 27. The latter is provided with a flange 28 at its periphery which mates with the flange 25 upon the shell member 20. Similarly, the lower end of the casing member 21 is provided with a flange 29 which mates with a peripheral flange 30 upon the pan bottom 31 and in this case bolts and nuts 31¹ cooperate with openings through the flanges to secure the members 21 and 31 together. The top 27 and the bottom 31 are also formed of sheet metal and, as before, this metal is preferably copper. In horizontal cross section the shell of the pan is also preferably circular.

The condensing mechanism is located in the upper part of the pan, this part being clear of heating coils. This mechanism includes a trough 32 which has an outlet pipe 33 which communicates through a pipe 34 with the usual condensing pump employed in vacuum pan installations. The trough 32 has an open top and it lies directly beneath the spray pipe 35. The latter has a large number of small openings 36 in its under side and from these, small jets of water strike upon the vapors which rise in the pan and condense them within the trough 32. The water thus delivered to the trough is carried off through the pipe connections 33 and 34 as rapidly as received. As shown, the spray pipe 35 and the trough 32 are circular and concentric with respect to the vertical axis of the pan. The dash lines 37 in Fig. 2 indicate in a general way the direction in which the water is projected from the pipe 35 toward and into the trough 32.

The trough 32 is made up of two walls 38 and 39. These walls are spaced apart to provide an insulating air space 40. This is for the purpose of preventing condensation on the under side of the trough and requiring the vapors to rise to the upper side of the trough before the water is condensed from them. Upon the upper side they will encounter the condensing waters from the openings 36 and will be promptly condensed. The walls 38 and 39, which are preferably composed of copper, are separated at their top inner edges by a band or ring 41 which lies as a horizontal circle concentric with the vertical axis of the pan. The outer edges of the walls 38 and 39 are connected and spaced by a similar ring 42 which is concentric with the inner ring 41. The trough 32 is supported as a whole by a plurality of brackets 43, in the embodiment illustrated four such brackets being used. These brackets are secured at their upper ends to the pan top 27 by any suitable means, such as bolts and nuts 44. The lower ends of the brackets 43 are secured to the outer edge of the trough 32, preferably by screw bolts 45 which extend through the walls 38 and 39 and the intervening ring 42, and are provided with suitable nuts. Obviously, other arrangements might be made for supporting the trough 32, but it is desirable in any event to make the supporting means small so that they will not interfere with the flow of vapor through the upper portion of the pan to the condensing zone above the trough 32.

Where the pipe elbow 33 is connected to the trough 32 the walls 38 and 39 may be brought together so as to form a body with which suitable attaching means, such as the bolts and nuts 46, may be used. Of course, other arrangements might be employed, if desired. The elbow 33 is flanged at the point where it engages the shell member 20, and its flange 47 cooperates with a mating flange 48 on the pipe 34 to complete the connection from the trough to the pump. Of course, the shell member 20 is perforated at the points where the pipes 33 and 34 register, and the flanges 47 and 48 are used in forming a tight joint at this point. Preferably, bolts and nuts 49 serve as connecting means, each bolt passing through both flanges as well as through an opening in the intervening shell member 20.

The spray pipe 35 may also be variously mounted. In the embodiment shown a plurality of hangers 50 are employed for this purpose. Each hanger is curved at its lower end to embrace the under side of the pipe 35 and it is bent at an angle at its upper end to provide a lug by which it may be secured to the pan top 27. Preferably, connections are made between the hangers 50 and the pan top by means of bolts and nuts 51. The connection of the spray pipe 35 to the pan top 27 is also increased by the supply connection through which water is admitted to said pipe. This connection includes a tubular part 52 upon the pipe 35 which is provided with a flange 53 which engages the inner face of the shell top 27 around the opening 54 in said top. In like manner the flange 55 upon the supply pipe 56 surrounds the same opening and the flanges 53 and 55 are mated and, in a manner similar to the flanges 47 and 48, these flanges are connected by bolts and nuts 57. The spray pipe 35 is further supported by a similar pipe connection which includes the flanged portion 58 and the flanged pipe connection 59, likewise secured to the shell member 27 by bolts 60 about an opening 61 in the shell. In this case the short pipe section 59 is provided with a cap 62. The purpose of the opening 61 with these associated parts is to provide access to the interior of the spray pipe 35 to enable it to be readily cleaned out as occasion may require. By removing the cap 62 a brush may be inserted through opening 61 and into the interior of the pipe 35 for thus cleaning it.

With the construction shown, it will be apparent that the vapors rising from the lower portion of the pan will pass upward both through and around the trough 32 and strike against the pan top 27 and thence be brought into contact with the jets of water coming from the spray pipe 35. Then condensation will take place and the water will pass off through the trough and pipe connections, as before explained. To assist in properly directing these vapors in their travels from the lower part of the pan to the zone where they will be subject to the sprays of the cooling water, I employ a baffle plate 63 which is circular in outline and lies just outward of the spray pipe 35. The upper end of this baffle is outwardly flanged for connection to the pan top 27. Any suitable connecting means may be employed for this purpose, such as the screw bolts and associated nuts 64. The baffle plate 63 serves to guide the vapors which pass upward around the outside of the trough 32 down into the condensing water jets. The same plate also serves to bring about a downward movement of those vapors which pass up through the center of the trough 32. As such vapors spread out, they encounter the baffle and move downward under the pressure of other vapors behind them and are thus brought into contact with the water jets, as before. The arrangement of parts in the top of the vacuum pan also prevents the formation of eddies in which the vapors may remain without circulating to those parts of the pan where they will come into contact with the condensing water.

The heating units at the bottom of the vacuum pan are, in the present instance, individual circular units comprising in each instance an inlet member 65, an outlet member 66, and tubular connecting members 67. The members 65 and 66 are preferably in the form of castings, while the tubular members 67 which connect them are composed of sheet metal, preferably copper, and the ends of the members 67 are brazed to the castings. At this point it may be noted that these units form the subject matter claimed in the aforesaid parent case. For this reason their specific structure need not be described herein. Suffice it to say that they are annular units each having an inlet and an outlet and each having a bore which at every point is preferably elliptical in radial cross section, the major axis of the ellipse lying horizontal; all as more fully explained in said parent case.

The inlet and outlet members, 65, 66, are provided with suitable flanges and are connected thereby to the shell of the pan, each inlet member communicating with a supply pipe 68 and each outlet member with a discharge pipe 69. It will be seen that the members 65 and 66, being securely attached to the casing 21 at two points, will serve to support the units quite well.

I have not shown the connections by which steam is supplied to the heating units, but it will be obvious that the various pipes 68, which are the inlet pipes, will be connected to a source of supply, and the outlet pipes 69 may be connected, as desired, to any outlet.

In this connection it may be noted that the central opening through the condenser trough 32 and the peripheral opening around it, due to its being spaced inward from the walls of the pan, are such that a man within the pan may reach up, either while standing on the bottom of the pan or on a ladder within it, and wash both the outside and the inside of the condenser trough and other adjacent parts.

In order to get access to the interior of the pan, it has been customary to employ an upper manhole provided by a tubular extension 70 formed in the casing member 20, as clearly shown in Fig. 1. This extension is ordinarily fitted with a cover 71 provided with a peek hole 72 through which the operator may inspect the contents of the pan at any time. The cover, which is provided with two handles 73, is held in place normally by the vacuum within the pan.

An additional manhole opening is provided in the bottom plate 31 of the pan. This manhole structure preferably includes a ring 74 which is secured to the bottom 31 and the ring serves as a support and seat for the removable cover 75. To seat the cover I preferably employ a cross bar 76 which cooperates at its ends with lugs 77 and 78 extending downward from the ring 74. The ends of the bar 76 and the lugs 77 and 78 are apertured to allow the entrance of retaining pins. One of these pins is removed as a step in the operation of loosening up the parts to remove the cover. The latter, however, cannot be removed until the central clamping screw 79 is loosened. This screw has a swivel bearing in the cover 75 and is threaded to engage a threaded opening in the bar 76. At its outer end the screw 79 is provided with a cross pin 80 to enable it to be readily turned. In practice, while the cover 75 occupies a position close to the bar 76, the latter is moved about one of its pivot pins from its open position up to the point where the other pin may be inserted to hold that end of the bar. When this is done, the cover 75 will not be in close contact with its seat. Such close contact, however, will be brought about by turning upon the screw 79 to force the cover 75 against the seat. All this manhole structure is fully disclosed in my parent case and is also claimed therein.

Adjacent to the lower manhole, the bottom 31 of the pan has an opening and associated drain pipe connection 81 which is connected to an outlet pipe which in turn runs to any suitable discharge point. When not serving to drain the pan, this connection is of course closed. Ordinarily, this is done by a valve in the outlet pipe.

It will be seen that the manhole opening in the bottom 31 is in substantial alignment with the central space embraced by the heating units and that a workman entering the pan by this opening would be able at once to work upon the heating units, the wall, and other parts which would need to be cleaned.

The vacuum pan connections are the usual ones. There is provided a milk inlet 82. On the inside of the pan this inlet extends downward in the form of a pipe 83. The inlet 82 is a connecting member similar to the outlet member 81. Ordinarily, pipe connections are made with this inlet from a suitable source of liquid supply. In the case which we have chosen to illustrate, this supply is a milk supply. In addition to the milk inlet 82, the usual vacuum break is connected to the vacuum break inlet 84. This inlet is similar in construction to the inlet 82. Ordinarily, a short piece of pipe is secured to the inlet member 84 and the valve is located in this pipe to open and close the interior of the pan to atmosphere. In other words, when the valve is open, the interior of the pan is open to atmosphere and the vacuum is broken. However, whenever the valve is closed and the condensing pump is operating, a vacuum is soon built up again.

In operation, the attendant opens the pipe connected with inlet 82 and milk flows into the pan. Of course, before admitting the milk he closes the bottom manhole cover 75 and at the same time closes the outlet opening 81. The bottom being thus closed, the milk accumulates in the pan until it covers one of the heating units. Steam is then admitted to that unit. The effect is to immediately cause the milk to boil. As the milk continues to enter it will not be long until the second heating unit is covered. Then steam is admitted to the second unit. This course is continued until all the units are covered and steam has been admitted to all the units. The result of such an operation is to cause the milk to boil vigorously under the vacuum, which is a vacuum of from 22 to 24 inches. The water vapors rising from the milk pass upward through and around the trough 32. There they encounter the condensing water and are themselves condensed and pass out through the trough and its connections.

Although I have specified copper as the metal best adapted for the shell and other parts of my vacuum pan, it will be understood that in certain cases other metals may be used, such as Allegheny metal or the like, in fact any metal that may be brazed or welded and would be suitable for the uses to which the pan is to be put.

In carrying out my invention, some alterations and modifications of the structure which I have shown may be made without departing from the spirit and scope of the invention. I therefore do not wish to be limited to the details herein disclosed, but aim to cover by the terms of the appended claims all those changes which rightly come within the scope of the invention.

I claim:—

1. In a vacuum pan having a cylindrical casing provided with steam coils in its lower part and a clear upper part, the combination of an open topped condenser trough within said cylindrical casing near its top, said trough extending about a central opening and being spaced from the wall of said casing, thus providing a central opening and an outer peripheral opening both for the upward passage of the vapors, a condensing water supply pipe shaped to conform to the shape of said trough perforated on its under side and positioned immediately above the open mouth of said trough so as to discharge its waters into said trough throughout substantially the entire extent of said trough, a suction outlet for said trough, and baffling means extending throughout the extent of said trough and above the same in proximity to said condenser pipe to direct the vapors rising both through said central passage and through said peripheral passage into effective contact with the water being ejected in small streams from said supply pipe into said trough.

2. In a vacuum pan having a cylindrical casing provided with steam coils in its lower part and a clear upper part, the combination of an open topped condenser trough within said cylindrical casing near its top, said trough extending about a central opening and being spaced from the wall of said casing, thus providing a central opening and an outer peripheral opening both for the upward passage of the vapors, a condensing water supply pipe shaped to conform to the shape of said trough perforated on its under side and positioned immediately above the open mouth of said trough so as to discharge its waters into said trough throughout substantially the entire extent of said trough, a suction outlet for said trough, (and a baffle plate secured to the top of said casing) and extending downward about said supply pipe in proximity to the same in position to direct the vapors rising both through said central passage and through said peripheral passage into effective contact with the water being ejected in small streams from said supply pipe into said trough.

3. The combination of an open topped condenser trough, said trough extending about a central opening, means for providing a passage for vapors about the outside of said trough, thus a central opening and an outside passage being provided about said trough for the upward flow of vapors to be condensed, a condensing water supply pipe shaped to conform to the shape of said trough, perforated on its under side and positioned immediately above the open mouth of said trough so as to discharge its waters into said trough throughout substantially the entire extent of said trough, a suction outlet for said trough, and baffling means extending throughout the extent of said trough and above the same in proximity to said condenser pipe to direct the vapors rising both through said central opening and through said peripheral passage into effective contact with the water being ejected in small streams from said supply pipe into said trough.

4. The combination of an open topped condenser trough, a casing surrounding said trough, said trough extending about a central opening and being spaced inward from the wall of said casing, a central opening and an outside peripheral passage being thus provided for the upward flow about said trough of vapors to be condensed, a condensing water supply pipe shaped to conform to the shape of said trough, perforated on its under side and positioned immediately above the open mouth of said trough so as to discharge its waters into said trough throughout substantially the entire extent of said trough, a suction outlet for said trough, and a cooperating casing top and baffle plate secured thereto and extending downward of said supply pipe in proximity to the same in position to direct the vapors rising both through said central opening and through said peripheral passage into effective contact with the water being ejected in small streams from said supply pipe into said trough.

ALEXANDER J. HLATKY.